United States Patent

[11] 3,574,334

[72] Inventor William J. Roach
San Mateo, Calif.
[21] Appl. No. 798,006
[22] Filed Feb. 10, 1969
[45] Patented Apr. 13, 1971
[73] Assignee Oxford Laboratories,
San Mateo, Calif.
Continuation-in-part of application Ser. No.
687,372, Dec. 1, 1967, now Patent No.
3,452,901, dated July 1, 1969.

[54] DILUTOR PIPETTE
3 Claims, 6 Drawing Figs.
[52] U.S. Cl. .................................................. 222/385
[51] Int. Cl. ..................................................... B67d 5/70
[50] Field of Search........................................ 222/43,
309, 385, 255

[56] References Cited
UNITED STATES PATENTS

| | | | |
|---|---|---|---|
| 3,067,915 | 12/1962 | Shapiro et al. ................ | 222/255 |
| 3,118,568 | 1/1964 | Bishop et al. ................. | 222/43 |
| 3,138,290 | 6/1964 | Coulter ........................ | 222/145X |
| 3,143,252 | 8/1964 | Shapiro ........................ | 222/309 |
| 3,452,901 | 7/1969 | Roach .......................... | 222/49 |

Primary Examiner—Samuel F. Coleman
Assistant Examiner—Norman L. Stack, Jr.
Attorney—Limbach & Limbach ABSTRACT: A dilutor pipette for accurately dispensing a precise amount of sample material together with a variable selected precise quantity of diluent is described having a diluent container, measuring and dispensing mechanism and a sample syringe barrel connected to said diluent dispensing mechanism with diluent and sample barrels provided with annular sharp transverse edges.

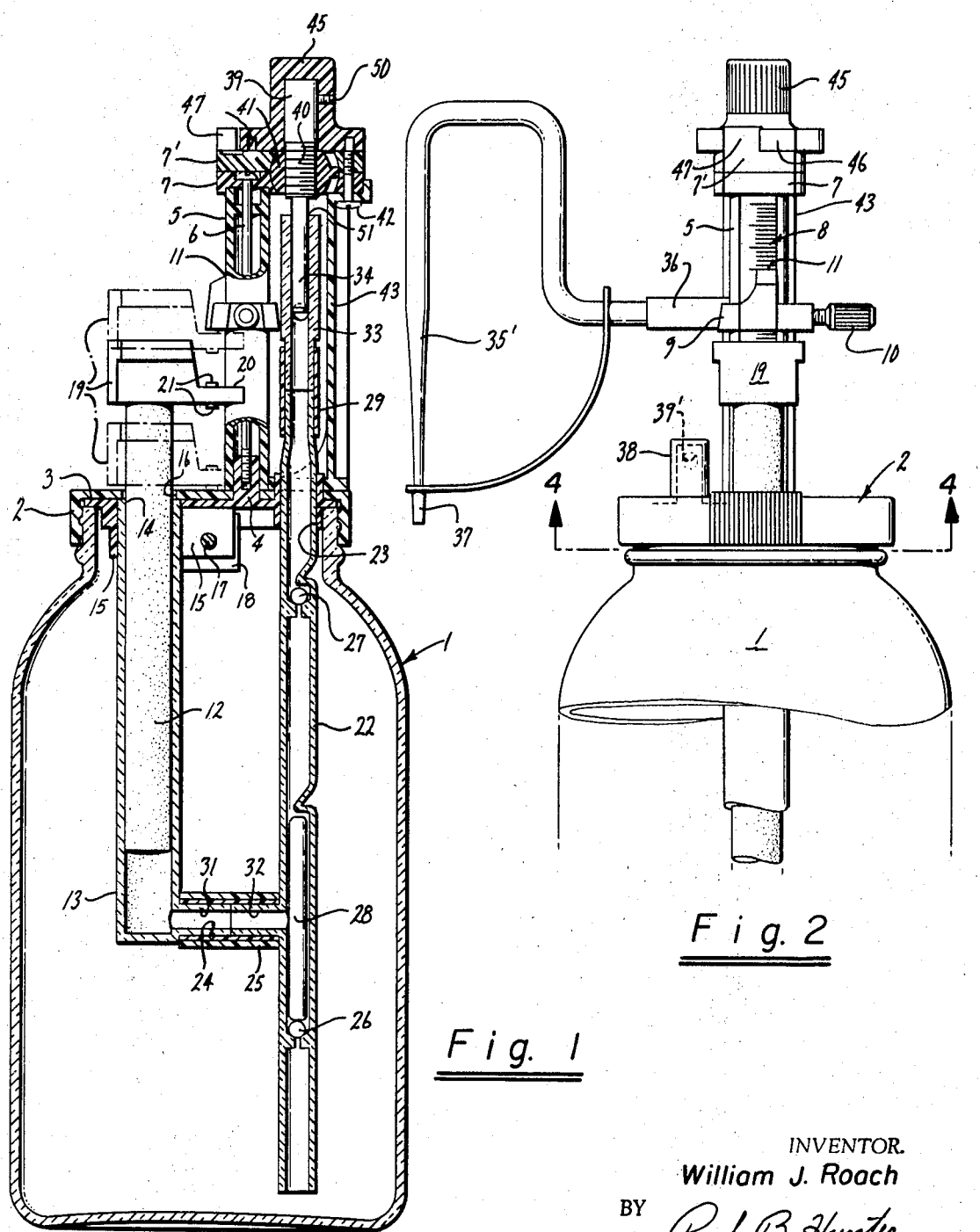

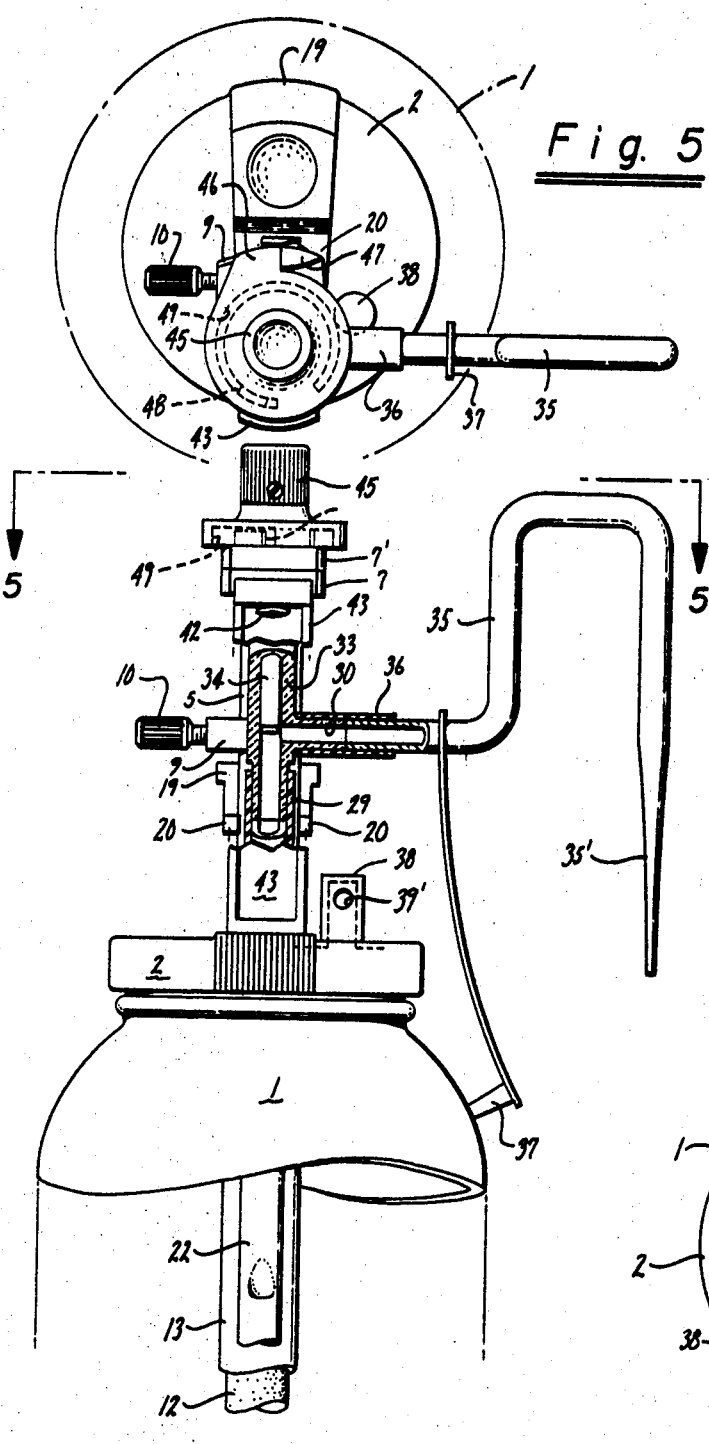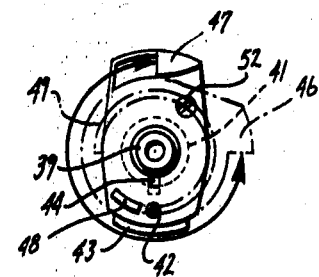

3,574,334

DILUTOR PIPETTE

This application is a continuation-in-part of U.S. Pat. application Ser. No. 687,372, filed Dec. 1, 1967, now U.S. Pat. No. 3,452,901, issued Jul. 1, 1969.

This invention relates generally to dilution devices, and the invention has reference more particularly to a novel dilutor pipette capable of discharging a precise constant volume of sample and a variable selected volume of diluent therefor.

Dilutors heretofore produced for diluting a desired amount of sample with a liquid diluent have generally been more or less complicated and expensive to build and have been difficult to maintain in a clean operating condition, with the result that such devices often have to be laid up for repairs or return to the manufacturer to be thoroughly cleansed at regular intervals. Furthermore, such prior art devices generally have a substantial portion of the apparatus in the form of exposed glassware, such as measuring apparatus projecting above a bottle or other liquid container for the diluent, resulting in frequent breakage and necessitating expensive replacement of major parts of the device. In addition, such external mountings of the operating parts of the devices heretofore produced necessitate careful handling and prevent easy storage of the same.

The principle object of the present invention is to provide a novel dilutor pipette for accurately dispensing a precise amount of sample material together with a variable selected precise quantity of diluent, the said dilutor pipette substantially eliminating the above-recited deficiencies and having self-cleaning features, dependable reproducibility, and a major portion of its operating structure contained within the bottle or other liquid container used, whereby the major parts of the device are protected against direct contact with external objects which would otherwise tend to break or damage the same, as during handling.

A feature of the present invention is to provide a novel dilutor pipette of the above character that is made up of components so constructed and arranged that they are readily dismounted, enabling the device to be taken apart and cleaned by the user without the necessity of returning the pipette to the supplier or manufacturer.

Another feature of the present invention is to provide a novel dilutor pipette of the above character is not only of rugged, simple construction and having a low profile so as to reduce space requirements in refrigerators and cabinets, but that is so constructed as to be capable of relatively long use without the necessity of cleaning the same.

Another feature of the invention is to provide a dilutor pipette having a novel sample syringe for operation in conjunction with a connected diluent supply source.

These and other features and advantages of the present invention will become more apparent after a perusal of the following specification taken in connection with the accompanying drawings wherein:

FIG. 1 is a part vertical, sectional view of the novel dilutor pipette of this invention;

FIG. 2 is a fragmentary view taken at right angles to the structure of FIG. 1;

FIG. 3 is a view similar to FIG. 2 but taken on the reverse side thereof, with parts broken away;

FIG. 4 is a sectional view taken along line 4—4 of FIG. 2;

FIG. 5 is a plan view taken along the line 5—5 of FIG. 3; and

FIG. 6 is a fragmentary view of a portion of the structure of FIG. 5, with the sample knob removed, illustrating operation of the sample syringe.

Similar characters of reference are used in the above FIGS. to designate corresponding parts.

Referring now to the drawings, the reference numeral 1 designates a glass bottle or other container having a threaded top portion upon which a cap structure comprising an outer cap 2, as of polypropylene, is adapted to be screwed. The cap structure also includes an inner cap 3 contained within the outer cap 2 and in abutting relation thereto, said inner cap having a peripheral lip extending over the top edge of the bottle 1 in sealing relation and confined therebetween and the inner surface of the outer cap 2. Inner cap 3 is provided with an upwardly extending boss 4 that projects through an opening in the outer cap and into the interior of a hollow upwardly extending scale post 5.

The structure so far described is similar to that disclosed in my copending application, Ser. No. 687,372 now U.S. Pat. No. 3,452,901, for Liquid Dispensing Device, filed on Dec. 1, 1967. The upper end portion of scale post 5 projects into a conforming socket provided in the undersurface of a lower bearing plate 7. A central post mounting screw 6 has its head mounted in a recess in the upper surface of bearing plate 7 and extends downwardly through this plate and through the hollow scale post 5 and is threaded at its lower end portion into the inner cap boss 4, to thereby retain the bearing plate 7 and scale post 5 and the inner cap 3 assembled with the outer cap 2.

The scale post 5 is provided with a graduated volume scale 8 inscribed on the exterior wall thereof. An indicator stop member 9 surrounds and is adjustable along the length of scale post 5 and is adapted to be secured in any desired vertically adjusted position by means of a tightening screw 10 threaded thereinto and abutting scale post 5. Indicator stop member 9 is provided with an upstanding boss having a knife edge 11 for reading the position of the stop against the scale 8, to thereby indicate the amount of liquid diluent to be dispensed at any time.

Pumping of the liquid diluent is accomplished through the use of a hollow glass cylindrical plunger 12 that is ground to the same diameter for the full length thereof to great accuracy. This ground glass plunger 12, which is closed at its lower end, preferably has a slight inward taper at its lower end portion to facilitate easy entrance of the same into its cooperating barrel 13. Barrel 13 extends vertically within the bottle 1, and the inner surface of this barrel is truly cylindrical throughout its length and has no upper inner edge bevel as is customary in pipettes, but instead is square at its upper inner end edge 14, providing a sharp transverse edge which scrapes any sediment or residue lodged on plunger 12 therefrom each time the plunger moves downwardly in use, so that such residue is prevented from binding the plunger 12 in the cylindrical barrel 13, which would otherwise render the device useless and require frequent cleaning. Pipette barrels as heretofore constructed are beveled at their inner upper edges to facilitate the insertion of the plunger, but such bevels become a lodging place for residue resulting from evaporation of the liquid used in the device and soon necessitate the servicing of the pipette. Also, in the past, the plungers have been generally recessed near their tops adjacent the actuating handle which collects additional sediment and is harmful since residue collecting below the handle will cause binding and prevent full insertion of the plunger. The plunger 12 of this invention, being of uniform diameter throughout its length, does not collect sediment, thus enabling the device to be used for long periods of time without the necessity of recleaning.

The barrel 13 is retained in position on the inner cap 3 with its top squared edge abutting the undersurface of the outer cap 2 and adjacent a circular opening 16 in the outer cap by means of a split sleeve or flange 15 formed on the inner cap and depending therefrom. Sleeve 15 is held in gripping relation with the upper portion of the barrel 13 by means of a tightening screw 17 passing through inwardly directed flanges provided on the sleeve 14 and threaded into a nut 18. An operating handle 19 is attached to the upper end of plunger 12 and has a transversely projecting bifurcated portion 20 that engages scale post 5 in sliding relation, the bifurcation of this projecting portion serving to prevent the turning of plunger 12 about its longitudinal axis. The bifurcated projection 20 has small upper and lower bosses 21 for abutting the indicator stop 9 and outer cap 2 respectively to limit the vertical movement of the plunger 12.

The lower end portion of the barrel 13 is formed with a transversely extending tubular stem 31 that is adapted to abut a similar stem 32 provided on an upstanding glass tube 22 that extends parallel to the barrel 13 and projects through an entrance sleeve 23 provided on the inner cap 3, which sleeve projects through a conforming aperture in the outer cap 2. A connector or sleeve coupling 24, as of Teflon, interconnects the two tubular stems 31 and 32 in sealing relation, and a surrounding spacer sleeve 25, also preferably of Teflon, spaces the glass tube 22 with respect to barrel 13 so that these members extend parallel to each other. The glass tube 22 is provided with lower and upper ball valves 26 and 27 below and above the tubular stems 31 and 32, the lower ball valve 26 being shown weighted by a glass stem 28.

The upper end portion of the upstanding glass tube 22 exteriorly of the outer cap 2 is reduced in diameter and connected by a Teflon connector or coupling 29 to the reduced lower end portion of a sample syringe barrel 33 that is open at its top and provided with a sharp inner edge as in the case of barrel 13 for cooperating with a plunger 34. Plunger 34 extends downwardly within barrel 33 substantially to a branch tubular stem 30 (see FIG. 3) provided on the barrel 33. Stem 30 is connected to a glass delivery tip 35 by a Teflon connector 36, which delivery tip is suitably bent up and over in inverted U-shape and has a depending free end portion 35' for receiving a sample and for discharging diluent and sample liquid into a suitable container, as will further appear, the free end portion of this delivery tip being suitably reduced, as shown. A delivery tip cap 37, preferably of flexible plastic, is adapted to be inserted over the free end of delivery tip 35' when the dispensing device is not in use, to prevent the ingress of air and the egress of liquid.

The upper end portion of sample plunger 34 projects into and is secured within a hollow vertical shaft 39, as of polypropylene, that is threaded at 40 for engaging in a spherical nut 41. Nut 41 is retained in conforming sockets provided in lower bearing plate 7 and a cooperating upper bearing plate 7'. Bearing plates 7 and 7' are secured together by a screw 42 that is carried by a bracket 43 extending upwardly from the outer cover 2 and by a screw 52. A pin projection 44 on spherical nut 41 engages in a vertical slot in bearing plates 7 and 7' and prevents this nut from turning when shaft 39 is turned while allowing universal alignment of shaft 39 and hence sample plunger 34 with sample syringe barrel 33, permitting easy movement of plunger 34 within barrel 33.

A sample knob 45 is fixed upon the upper portion of shaft 39 so that, as this knob is turned, shaft 39 is threaded into and out of nut 41, depending on the direction of turning, thereby raising and lowering while turning sample plunger 34 in syringe barrel 33, to thereby aspirate sample liquid into or out of the lower portion 35' of the delivery tip. Knob 45 is formed with a projection 46 for cooperating with a stop projection 47 extending upwardly from bearing plate 7', to thereby limit the downward movement of plunger 34, the upward movement of the plunger 34 being limited by a second upstanding stop projection 48 on bearing plate 7' engaging in a partial annular slot 49 in knob 45. In a typical installation, the turning of the sample knob 45 approximately three-quarters of a turn counterclockwise from its primary stop position shown in FIG. 5 to the secondary stop dot-dash position shown in FIG. 6 will produce a 20-microliter sample intake at the delivery tip lower portion 35'.

A hollow cylindrical vent 38 is formed on the outer cap 2 and extends upwardly therefrom for suitable attachment to filtering and/or drying devices, the said vent 38 having an aperture 39' into which tubing may be inserted for this purpose, a suitable hose being attached to the tubing in use. Preferably, the upper portion of plungers 12 and 34 are given a light silicone coating occasionally which not only facilitates the movement of these plungers within their barrels but also helps to seal the same in use. Any deposited residue collecting upon the upper portion of the plungers 12 and 34 in use is removed by the sharp edges 14 and 45' of the barrels whenever the plungers are depressed, whereby the device of this invention may be used for long periods of time without cleaning. When it is desired to disassemble the device for cleaning, this can be done readily by the user by initially removing the sample knob 45, by loosening set screw 50, unscrewing the threaded sample shaft 39, removing the bearing plates 7, 7' and nut 41, and removing the scale post 5 and diluent plunger 12.

In use, with the bottle 1 filled with diluent to a maximum of about 2 inches from the top and with the delivery tip 35' fully charged, the delivery tip is inserted about one-eighth of an inch into the sampling liquid and the sample knob 45 is gently rotated from its primary stop (with 46 abutting 47) to the secondary stop position caused by the stop projection 48 engaging the end of slot 49 as shown in FIG. 6. Then the sample container is withdrawn and the tip 35' wiped without touching the end thereof. The desired receiving vessel is now placed under the tip and the diluent handle 19 is lifted gently until it meets the preset indicator stop member 9. Thereafter, by depressing the handle 19 to its lowest position, the sample and the diluent will be delivered and at the same time all traces of the sample will be removed from tip 35', whereupon the sample knob 45 can be returned to its primary stop position shown in FIG. 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A dilutor pipette adapted to repeatedly dispense a constant volume of sample solution and a preselected volume of diluent therefor, comprising a diluent container having a cover, a diluent barrel within said container supported at its upper end by said cover, a diluent plunger having an operating handle exterior of said cover, a scale post cooperating with said operating handle to preselect a desired volume of diluent, said diluent plunger extending downwardly through said cover and within said barrel, a tubular member within said container, a connection between the lower end portion of said barrel and said tubular member, said latter member having valves below and above said connection within said container and having its upper end portion extending outwardly of said cover, a sample syringe barrel coupled at its lower end to the upper end portion of said tubular member and having a transverse output stem, a delivery tip coupled to said output stem, a sample plunger extending downwardly into said sample syringe barrel to a point adjacent said output stem, a sample knob, and a connection including a threaded structure between said sample knob and said sample plunger, the turning of said sample knob through a definite angle serving to cause said threaded structure to move said plunger to aspirate a predetermined quantity of sample from a container into said delivery tip, and depressing said diluent operating handle thereafter serving to dispense the sample and the preselected volume of diluent.

2. A dilutor pipette as defined in claim 1 wherein said threaded structure comprises a threaded shaft coupled to said sample knob, a spherical nut threaded on said shaft below said knob, a hollow spherical bearing means supporting said nut, said threaded shaft having its lower end coupled to said sample plunger for actuating the latter, said bearing means allowing automatic alignment of said sample plunger and sample syringe barrel to facilitate easy operation of said sample knob in use.

3. A dilutor pipette as defined in claim 2 wherein said diluent barrel and said sample syringe barrel are open at their upper ends for receiving said diluent plunger and said sample plunger respectively, said barrels and their cooperating plungers being of uniform diameters throughout their lengths, whereby there are no pockets in the opposing surfaces of said barrels and their plungers to accumulate harmful deposited material resulting from evaporation of liquid from the surfaces of said plungers, said barrels providing annular sharp transverse upper edges for scraping off any such material lodged on said plungers in use each time the plungers are moved downwardly into their barrels.